United States Patent
McAbee

(12) 
(10) Patent No.: US 6,404,519 B1
(45) Date of Patent: Jun. 11, 2002

(54) METHOD OF ADVERTISING ON A MOTOR VEHICLE

(76) Inventor: Mark Bradley McAbee, P.O. Box 187, Gold Hill, NC (US) 28071-0187

( * ) Notice: Subject to any disclaimer, the term of this patent is extended or adjusted under 35 U.S.C. 154(b) by 0 days.

(21) Appl. No.: 09/803,981

(22) Filed: Mar. 13, 2001

Related U.S. Application Data

(63) Continuation-in-part of application No. 09/640,269, filed on Aug. 17, 2000, now abandoned.

(51) Int. Cl.⁷ .................................................. G03H 1/22
(52) U.S. Cl. .............................. 359/32; 359/22; 359/25
(58) Field of Search ............................... 359/1, 13, 14, 359/22, 24, 25, 32

(56) References Cited

U.S. PATENT DOCUMENTS

| | | | |
|---|---|---|---|
| 4,878,719 A | * 11/1989 | Wreede et al. ................. | 359/24 |
| 5,142,384 A | 8/1992 | Wood et al. | |
| 5,223,357 A | 6/1993 | Lovison | |
| 5,413,863 A | 5/1995 | Weber et al. | |
| 5,724,161 A | * 3/1998 | Smith et al. ................... | 359/13 |
| 5,731,060 A | 3/1998 | Hirukawa et al. | |

OTHER PUBLICATIONS

Fred M.H. Gregory, "The Money Moment", Car and Driver, Jun. 2000, p. 167.

* cited by examiner

Primary Examiner—Darren Schuberg
(74) Attorney, Agent, or Firm—Nixon Peabody LLP; Thomas W. Cole

(57) ABSTRACT

A method of advertising on a motor vehicle having a substantially transparent window including steps of providing a holographic film with a holographic image, and adhering the holographic film to the window, where the holographic image is substantially transparent to an operator of the motor vehicle from within the motor vehicle so that operation of the motor vehicle is not impeded, but the holographic image is visible to an observer outside the motor vehicle. The present method may also include the steps of applying a transparent adhesive to the holographic film and/or the window. The holographic image may be a product name, a corporate name and/or a corporate logo. The motor vehicle may be a motorsport vehicle adapted to be raced in a race track with at least one other vehicle. The holographic image may be a numeral that distinguishes the motorsport vehicle but is preferably a sponsor advertisement that includes a product name, a corporate name and/or a corporate logo. The present method may include the step of illuminating the holographic image by providing a light source at a predetermined position to enhance visibility of the holographic image to the observer outside the motorsport vehicle, including the media.

23 Claims, 2 Drawing Sheets

FIG. 1
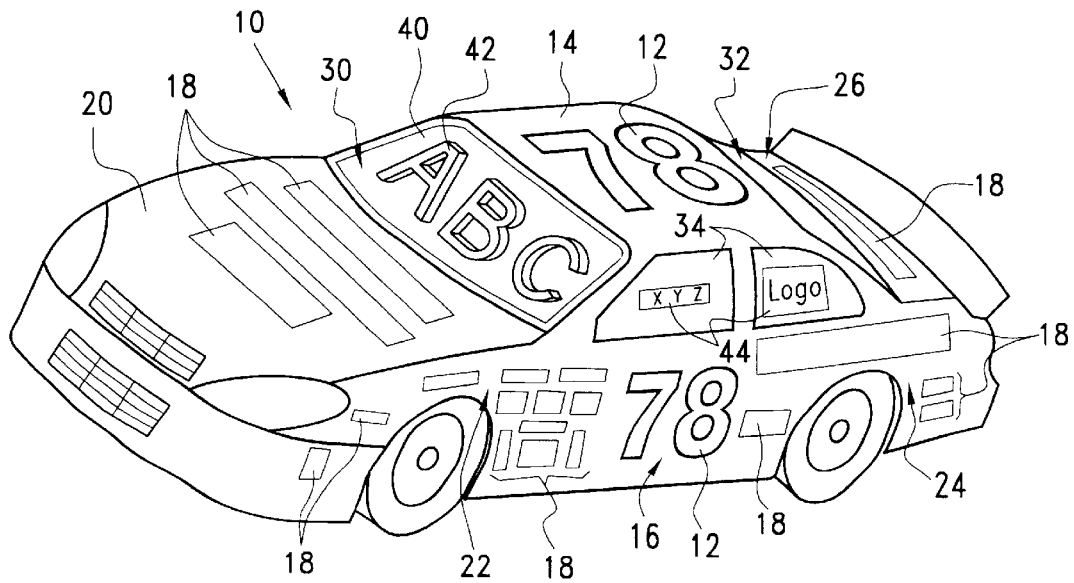
FIG. 2A  FIG. 2B
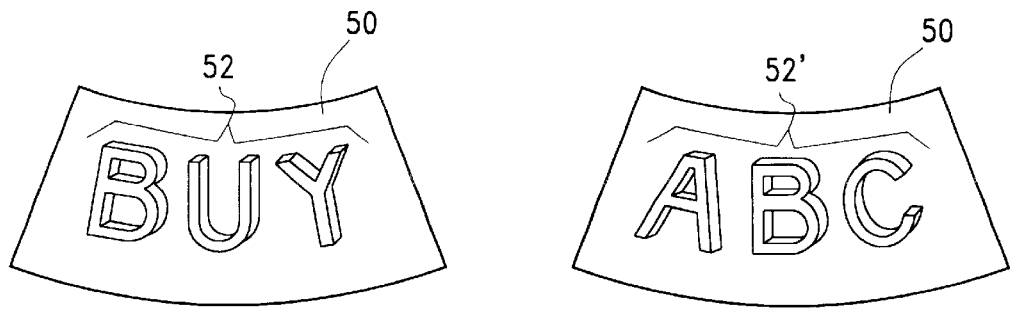
FIG. 3

METHOD OF ADVERTISING ON A MOTOR VEHICLE

This application is a continuation-in-part of pending application Ser. No. 09/640,269, filed Aug. 17, 2000, now abandoned.

BACKGROUND OF THE INVENTION

1. Field of the Invention

The present invention relates generally to a method of advertising, and more specifically, to a method of advertising on motor vehicles.

2. Description of Related Art

Providing advertisement on motor vehicles is well known in the art and various advertising methods have become known for this purpose. For instance, a motor vehicle may be provided with advertisement or logo on the vehicle's body such as the door or fender. These advertisements or logos may be painted on the vehicle's body or otherwise affixed, for example, by magnets or using decals with adhesives. These types of advertising methods have been extensively used in the art, especially in the field of motorsport where various motorsport vehicles race in a race track for prizes and recognition.

In these applications, the motorsport vehicles are typically provided with numerous advertisements on the body of the motorsport vehicle identifying the various sponsors of the motorsport vehicle as well as identifying the vehicle itself. For instance, the rooftop of the vehicle may be provided with an advertisement such as an identifying marker or number which clearly distinguishes one vehicle from one or more of the other vehicles that may be present on the race track and competing in the race. The remainder of the vehicle body including the hood, fenders, the doors, and the trunk may be provided with numerous advertisements of corporate sponsors and the like that have paid the motorsport vehicle's owner and/or operator for such rights to advertise and to be associated with the motorsport vehicle. Advertisements were also occasionally included in narrow bands that cover the outer peripheries of the front and rear windshields as well as the side windows (if such windows are provided). However, because maintaining visibility through the windows is important in not impeding the operation of the motorsport vehicle, such advertisement provided on the windows is severely limited.

Due to the fixed amount of surface area available on a motor vehicle's body, the advertising is often very small while the cost for placing such advertisement is very high, especially for vehicles which win races frequently. In exchange, however, the sponsors who purchase such space on the motorsport vehicles are provided with a very large spectator audience and media coverage that may continually view their advertisements as the motorsport vehicle is raced on the race track. Thus, although expensive, such advertising on the motorsport vehicle body by the sponsors provide direct and indirect benefits to the sponsors in increased sales of their products/services and improve goodwill toward the advertiser. Of course, the owner and/or operator of the motorsport vehicle would like to charge the highest amount possible for such advertising space on the motor vehicle body to maximize the revenue generated by such advertisements. Whereas the revenue which can be generated may technically only be limited by the surface area available on the vehicle's body, a more pragmatic limit exists. More specifically, if too many advertising is provided on a vehicle, the large number of advertising on the motor vehicle's body cause observers to ignore the advertisements thereby reducing advertisement's efficacy.

In view of the above, there exists an unfulfilled need for a novel method of advertising which will maximize the space available on the motor vehicle for displaying advertisements. There also exists an unfulfilled need for such an advertising method that will increase advertising opportunities for advertisers as well as maximizing the advertising revenues for the motor vehicle owner/operator. There further exists an unfulfilled need for a novel method of advertising that will increase advertising efficacy.

SUMMARY OF THE INVENTION

In view of the foregoing, it is an object of the present invention to provide a novel method of advertising on a motor vehicle where the surface area available for such advertisements is maximized.

A second object of the present invention is to increase opportunities for advertisers to place advertisements on a motor vehicle.

A third object of the present invention is to provide a novel method of advertising on a motor vehicle which will maximize advertising revenue for the motor vehicle owner and/or operator.

Yet another object of the present invention is to provide a novel method of advertising that will increase advertising efficacy.

In accordance with the various embodiments of the present invention, these and other objects and advantages are obtained by a method of advertising on a motor vehicle having at least one substantially transparent window comprising the steps of providing a holographic film with a holographic image therein, and adhering the holographic film to the substantially transparent window, where the holographic film and the holographic image are substantially transparent to an operator of the motor vehicle from within the motor vehicle so that operation of the motor vehicle is not impeded, but the holographic image in the holographic film is visible to an observer outside the motor vehicle. In accordance with one embodiment, the substantially transparent window may be a front windshield, a rear windshield, or a side window, but in one embodiment, is preferably a front windshield. The substantially transparent window may be made from glass, plastic, thermoplastic, Plexiglas®, or a polycarbonate such as Lexan®.

In accordance with another embodiment, the present method may also include the steps of applying an adhesive to the holographic film and/or the substantially transparent window before adhering the holographic film to the window, the adhesive being substantially transparent when set. In another preferred embodiment, the holographic image may be a product name, a corporate name and/or a corporate logo. In accordance with another embodiment of the present invention the holographic image may be three dimensional. In still another embodiment, the holographic film may include a plurality of holographic images therein, each of the plurality of holographic images being viewable at different viewing angles, and in such an embodiment, the plurality of holographic images may provide a continuous message. In yet another embodiment, at least one light source may be provided on the motorsport vehicle to illuminate the holographic image to enhance visibility of the holographic image in the holographic film.

In another embodiment of the present invention, the motor vehicle may be a motorsport vehicle that is adapted to be raced in a race track with at least one other motorsport vehicle. In such an embodiment, the holographic image may be a numeral that advertises the motorsport vehicle operator and identifies the motorsport vehicle thereby distinguishing the motorsport vehicle from the other motorsport vehicle. In the preferred embodiment, the holographic image may be a sponsor advertisement that includes a product name, a corporate name and/or a corporate logo. As previously noted, the holographic image may be three dimensional and may also include a plurality of holographic images therein that may provide a continuous message.

In addition, in such an embodiment, the present method may further comprise the steps of illuminating the holographic image by providing a light source at a predetermined position to enhance visibility of the holographic image in the holographic film to the observer outside the motorsport vehicle. In this regard, a plurality of light sources may be positioned along the race track to illuminate the holographic image to enhance visibility of the holographic image in the holographic film to a plurality of observers along the race track. In still another embodiment, the light source may be provided on the motor vehicle itself.

These and other objects, features and advantages of the present invention will become more apparent from the following detailed description of the preferred embodiments of the invention when viewed in conjunction with the accompanying drawings.

BRIEF DESCRIPTION OF THE DRAWINGS

FIG. 1 is a schematic illustration of a motorsport vehicle in accordance with one embodiment of the present invention.

FIG. 2A is a schematic illustration of one example of a holographic film with two holographic images therein in accordance with one embodiment of the present invention, only one image being shown.

FIG. 2B is a schematic illustration of the holographic film with two holographic images of FIG. 2A, the other image being shown.

FIG. 3 is a schematic illustration of another example of a holographic film with a holographic image in accordance with another embodiment of the present invention.

DETAILED DESCRIPTION OF THE PREFERRED EMBODIMENTS

Figure 4:
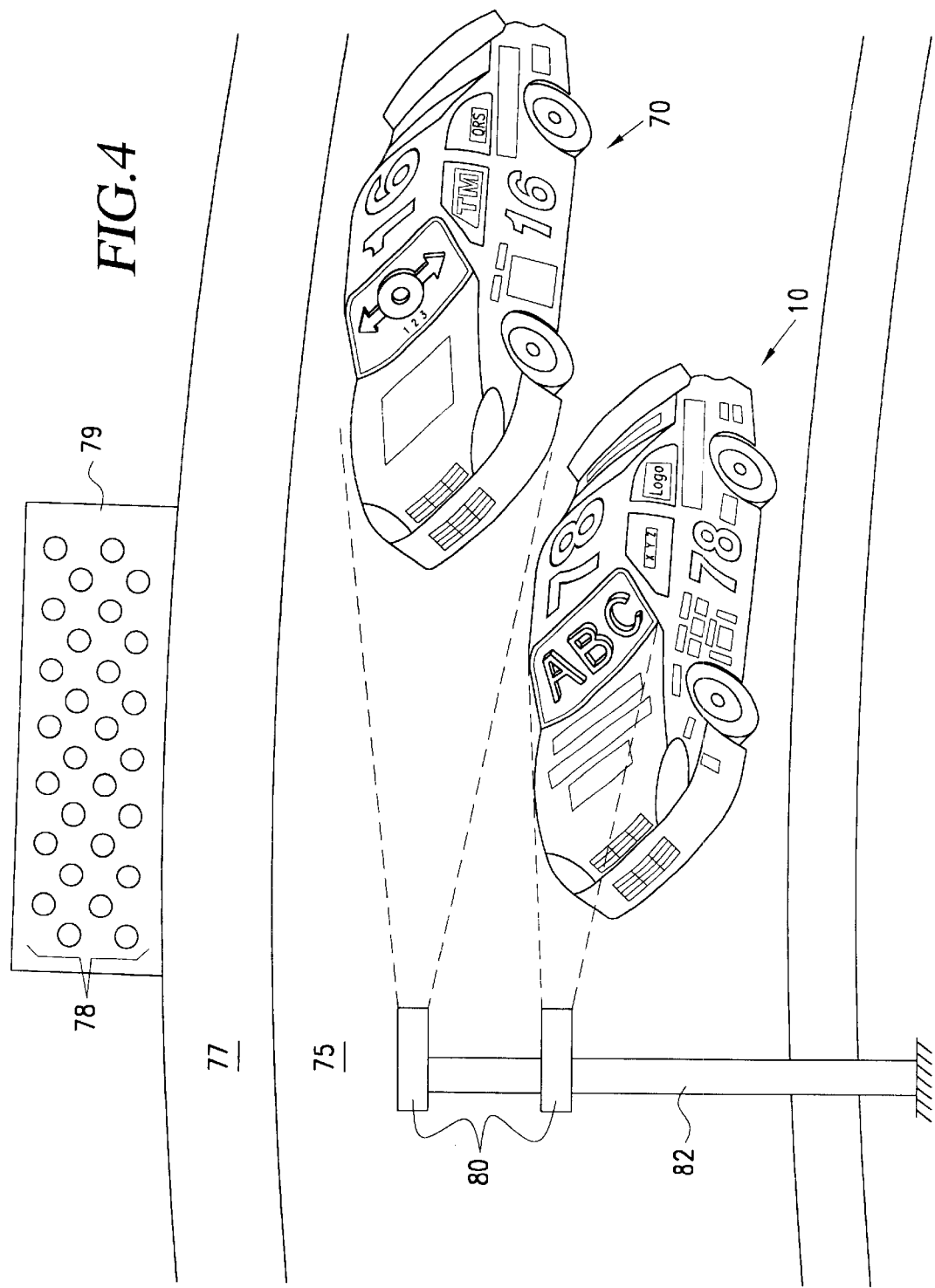
FIG. 4 is a schematic illustration of the motorsport vehicle in FIG. 1 being raced with another vehicle, both vehicles utilizing the present method of advertising in accordance with one embodiment of the present invention.

As will be discussed in detail herein below, the present invention provides a novel method of advertising which will maximize the space available on the motor vehicle for displaying advertisements. The present invention provides such an advertising method that will increase advertising opportunities for advertisers as well as maximizing the advertising revenues for the motor vehicle owner and/or operator. It should also become clear how the present invention also provides a novel method of advertising that will increase advertising efficacy.

FIG. 1 is a schematic illustration of a motor vehicle in accordance with one embodiment of the present invention. As can be appreciated by one of ordinary skill in the art, the motor vehicle illustrated is a motorsport vehicle 10 that is adapted to be raced in a race track with one or more motorsport vehicles (not shown). The discussion herein below utilizes such a motorsport vehicle 10 to fully disclose the present invention since the advantages of the present invention can be most readily be appreciated in such an application. It should be noted that present invention may also be applied to other vehicles including conventional "street legal" vehicles. However, it should be evident that the present invention is especially advantageous in motorsport vehicle applications.

As can be seen in FIG. 1, the motorsport vehicle 10 is provided with an identifying numeral 12 "78" on its roof 14 and "door" 16 (non-functional in this example) which is a special type of advertising that identifies and distinguishes the motorsport vehicle 10 from one or more of the other vehicles on the race track. Thus, this identifying numeral 12 may be understood to be an advertisement as used in the present invention since it advertises the identity of the vehicle and the owner and/or the operator. The presently illustrated motorsport vehicle 10 is also provided with a plurality of advertisements 18 (schematically illustrated) on its body including on its hood 20, fenders 22 and 24, and trunk 26, as commonly known in the art. These advertisements 18 may be more of the conventional types of advertising such as sponsor advertisement that includes a product name, a corporate name and/or a corporate logo, which in the present illustration, have been omitted for clarity purposes. As previously explained, these advertisements 18 provide advertising revenue for the motorsport vehicle 10 owner and/or operator while allowing the advertisers to market to a very large spectator audience thereby providing direct and indirect benefits to the sponsors in increased sales of their products and by improving their goodwill.

As can be appreciated in FIG. 1, the motorsport vehicle 10, like most motor vehicles, is provided with a plurality of substantially transparent windows including a front windshield 30, a rear windshield 32, side windows 34. These windows may be made from glass, plastic, thermoplastic, Plexiglas®, or a polycarbonate such as Lexan®, or any other appropriate material that is substantially transparent to thereby not impede the driver's visibility and allow the driver to properly operate the motorsport vehicle 10. As can also be appreciated in FIG. 1, the motorsport vehicle 10 is also provided with advertising on one or more of these substantially transparent windows in accordance with the present method of advertising.

In accordance with one embodiment of the present invention, the motorsport vehicle 10 is provided with a holographic film 40 which has been adhered to the front windshield 30. The holographic film 40 is substantially transparent and has therein, a hologram which is referred to herein as holographic image 42, which in the present example, advertises the letters "ABC". In accordance with the present invention, the holographic image 42 in the holographic film 40 is also substantially transparent to the operator of the motorsport vehicle 10 from within the motorsport vehicle 10 so that operation of the motorsport vehicle 10 is not impeded. However, the holographic image 42 in the holographic film 40 is visible to an observer outside the motorsport vehicle 10. Thus, in the illustrated example of FIG. 1, the visibility of the operator from within the motorsport vehicle 10 is not impeded so that the operator can properly operate the motorsport vehicle 10 even though the holographic film 40 with the holographic image 42 is provided on the front windshield 30. As can also be seen, other holographic films with holographic images that are advertisements are provided on other substantially transparent windows of the motorsport vehicle 10 including holographic films 44 on the side windows 34, these holographic films 44 having example images illustrated as "XYZ" and "Logo". Again, in accordance with the present invention, these holographic films 44 and the holographic images therein are substantially transparent to the operator of the motorsport vehicle 10 from within the motorsport vehicle 10 so that visibility is not impeded, but the holographic images are visible to an observer outside the motorsport vehicle 10.

The holographic films 40 and 44 are adhered to the substantially transparent window (namely the front windshield 30 and the side windows 34) in the manner shown in FIG. 1. Of course, a holographic film with a holographic image in accordance with the present invention is preferably provided in the side windows that are not shown in FIG. 1 and a holographic image may moreover be provided on the rear windshield 32 as well in other embodiments. These holographic films 40 and 44 may be adhered to the substantially transparent windows by applying an adhesive to the holographic film and/or the substantially transparent window prior to adhering the holographic film to the window. Preferably, the adhesive used should be very thin and substantially transparent when set so that it does not impede visibility of the operator of the motorsport vehicle 10. In addition, the adhesive may be provided on the surface of the holographic film itself so that a separate step of applying the adhesive would not be necessary and a more consistent thickness of the adhesive can be attained so that optical distortion due to varying thickness would not occur.

It should also be noted that to practice the present method of advertising, only one window needs to be provided with the holographic film having holographic image and the size of the holographic film and/or image may be adjusted depending on the placement of the advertisement on the motorsport vehicle. In addition, the placement of the holographic films in accordance with the present invention may be subject to limitations of the law or rules governing the particular motor vehicle to which the present method is applied. Thus, whereas in the example illustration of FIG. 1, holographic film 40 is provided on the front windshield 30, if there are visibility and safety regulations which prevent such provision on the front windshield in this or other applications, the holographic film need not be provided on the front windshield but may be provided on the side windows and/or the rear windshield. The present invention may be readily applied to the side windows and the rear windshield in a similar manner as the front windshield 30, and thus, the present invention should not be limited to a particular window of the motor vehicle.

It should farther be noted that the term "holographic image" as used herein should be understood broadly and can encompass any form or type of image such as advertisement(s), graphical illustrations and illusions, as well as any other type of visual display including (but not limited to) text, numerals, symbols, trademarks, servicemarks, etc. In a preferred embodiment of the present invention, the holographic images on the holographic films 40 and 44 are advertisements such as a product name, an organizational name, an organizational logo, a corporate name, a corporate logo or other image that is associated with the advertiser. Again, such advertisements provide advertising revenue for the motorsport vehicle 10 owner and/or operator while allowing the advertisers to market to a very large spectator audience to increase sales of their products and improve their goodwill. Thus, in the illustrated example of FIG. 1, the holographic image 42 of the holographic film 40 which is schematically shown as "ABC" is preferably an advertisement that indicates a product name, a corporate name, a corporate logo or other image that is associated with the advertiser. In a like manner, the holographic images on the holographic images on the holographic films 44 schematically shown as "XYZ" and "Logo" are also preferably advertisements that indicate product names, organizational names, organizational logos, corporate names, corporate logos or other images that are associated with the advertisers. In addition, in accordance with the illustrated embodiment of the present invention as shown in FIG. 1, the holographic image (a.k.a. hologram) may preferably be three dimensional in appearance as known in the holography art. Thus, the holographic image 42' illustrating "ABC" would appear to be three dimensional having a depth dimension as shown instead of merely a two dimensional image.

FIGS. 2A and 2B illustrate another example holographic film 50 in accordance with another embodiment of the present invention in which a plurality of holographic images are provided therein. As can be seen by comparing FIGS. 2A and 2B, two distinct holographic images 52 and 52' are provided in the holographic film 50 in the manner known in the holographic art. FIG. 2A illustrates one of the two holographic images 52 while FIG. 2B illustrates the other holographic image 52'. As also known in the art, each of the two distinct holographic images 52 and 52' which are provided in the holographic film 50 are viewable at different viewing angles. Thus, depending on the viewing angle of the observer viewing the holographic film 50, the holographic image (and correspondingly, the advertisement) may vary. In this regard, such a feature may be used advantageously so that the plurality of holographic images provide a continuous message such as the "BUY" "ABC" message provided in the example of FIGS. 2A and 2B that encourages the observer to purchase a product or service "ABC". Of course, "ABC" is fictional and is provided as one illustration only. Alternatively, the two distinct holographic images 52 and 52' may be two different advertisers advertising their respective products or corporation etc. This allows the owner and/or operators of the motor vehicle to which the present embodiment is applied to maximize space available for advertisement purposes by providing more than one advertisement on the same window surface thereby increasing advertisement revenue.

FIG. 3 is a schematic illustration of another example of a holographic film 60 in accordance with another embodiment of the present invention. As can be seen, the holographic film 60 is provided with a plurality of holographic images 62 that are advertisements which may be two or three dimensional, as well as one holographic image 64 which is a numeral that identifies and distinguishes the motorsport vehicle to which the holographic film 60 is applied from one or more other vehicles on the race track. It should also be noted that instead of providing a plurality of holographic images on one holographic film 60 as shown in FIG. 3, a plurality of holographic films (each having a holographic image) may be provided on the substantially transparent window, such as a front windshield, a rear windshield, and/or a side window of the motorsport vehicle.

FIG. 4 is a schematic illustration of the motorsport vehicle 10 of FIG. 1 being raced with another motorsport vehicle 70 (identified by the numeral "16" on its rooftop and door), both vehicles utilizing the method of advertising in accordance with one embodiment of the present invention. It should be initially noted that whereas the present embodiment shown is of motorsport vehicles going around a turn on an embankment of a race track 75, it should be emphasized that this illustrated application is merely one example and the present invention may also be used in other motorsport applications as well such as in drag racing where there are no turns or embankments.

As can be seen, in a similar manner described above relative to the motorsport vehicle 10, the motorsport vehicle 70 of FIG. 4 is also provided with holographic films that are adhered to the various substantially transparent windows including the front windshield, a rear windshield, and side windows. In the preferred embodiment shown, the holographic images provided on the holographic films are sponsor advertisements that includes either a product name, an organizational name, an organizational logo, a corporate name, a corporate logo, or other images that are associated with the advertisers. As also previously described, the holographic image may be three dimensional, may include a plurality of holographic images, and the plurality of holographic images may provide a continuous message. The specific details of the motorsport vehicle 70 should be evident to one of ordinary skill in the art in view of the prior discussion of the motorsport vehicle 10 and thus, are omitted herein to avoid repetition.

As can be seen in FIG. 4, the motorsport vehicles 10 and 70 are being raced in a race track 75, only a segment of which is illustrated. A barricade 77 separates the race track 75 from the spectators or observers 78 viewing the race from the spectator stand 79. The terms "observers" or "spectators" as used herein may include the media such as photographers, television and movie camera crews, and broadcasters. In this regard, the term "observers" should be understood to incorporate these and other media as well. As the motorsport vehicles 10 and 70 move around the track, the sponsors who advertise on the motorsport vehicles 10 and 70 are provided with a very large audience that continually view their advertisements. If the holographic images are three dimensional as described above, they would provide visual uniqueness to the advertisement as compared to the conventional labels presently used thereby creating a very favorable impression of the advertiser and/or its products to the observers 78 and thus, increasing advertising efficacy. In addition, if a plurality of holographic images are provided on the same holographic film and adhered to the window of the vehicle as previously described above relative to FIGS. 2A and 2B, the observers 78 can readily view both of these holographic images as a continuous message such as the "BUY" "ABC" message. In this regard, the fact that the motorsport vehicles 10 and 70 are rapidly moving on the race track 75 automatically causes the viewing angle of the observers 78 to change thereby causing the viewed holographic image to change from one image to the other and providing a dynamically changing advertisement that greatly increases advertising efficacy.

FIG. 4 also shows another embodiment of the present method in that a plurality of light sources 80 are provided at a predetermined position along the race track 75 to illuminate the holographic image to thereby enhance the visibility of the holographic image in the holographic film to the observers 78 along the race track 75. In this regard, the plurality of light sources 80 are preferably positioned and directed so that the light beams reflect off the holographic images of the holographic film in the direction of the observers 78 so that the visibility of the holographic images are greatly improved. Of course, the plurality of light sources 80 can also be positioned and directed so that the light beams reflect off the holographic images in the direction of the media such as photographers, television and movie camera crews, and broadcasters so that the advertising is clearly received by the media.

In the illustrated embodiment of FIG. 4, the plurality of light sources 80 are provided on a pole 82 but such light sources 80 may alternatively be provided on an overpass or any other appropriate structure that will allow illumination of the holographic image of the holographic film. The light sources 80 may be any type such as halogen, arc, discharge, incandescent or any other appropriate lamps that are well known in the art. Preferably, the light beam of the light sources 80 can be focused and controlled so that illumination of the holographic image can be easily directed. In one embodiment, these light sources 80 may be mounted at various points of the race course and/or track 75 and aimed to particular areas through which the motorsport vehicles 10 and 70 travel through thereby providing the observers 78 in the proximate areas an enhanced visual experience from the reflection of the light beam upon the holographic image. In other embodiments, the more conventional race track lighting systems that are currently used for night racing can also be used. In such an embodiment, lamps that are provided "in ground" (not shown) may be used to provide light beams that is then reflected by reflectors (not shown) onto the track to thereby illuminate the track and the motorsport vehicles being raced thereon. The reflections of the light beams provided by the "in ground" lamps may be directed by the reflectors or by any other appropriate means in accordance with the present invention so that the light beams reflect on the holographic image of the holographic film in the direction of the observers 78 so that the visibility of the holographic images are greatly improved. Of course, it should also be noted that in yet another embodiment of the present invention, the light source may instead be provided directly on the motorsport vehicles 10 and 70 so that the holographic image is continually or selectively illuminated.

Thus, in view of the above, it should now be clear to one of ordinary skill in the art how the present invention provides a novel method of advertising which will maximize the space available on the motor vehicle for displaying advertisements by utilizing previously unused areas of a motorsport vehicle including the windshields and windows. It should also be clear how the present invention provides an improved advertising method that will increase advertising opportunities for advertisers as well as maximizing the advertising revenues for the motor vehicle owner and/or operator. Moreover, it should also be clear how the present invention also provides a novel method of advertising that will increase advertising efficacy by increasing viewing of advertisements to aiding in consumer retention, providing advertisements with visual uniqueness caused by a three dimensional medium, and providing multiple messages within the same advertising area.

While various embodiments in accordance with the present invention have been shown and described, it is understood that the present invention is not limited thereto. The present invention may be changed, modified and further applied by those skilled in the art. Therefore, this invention is not limited to the details shown and described previously, but also includes all such changes and modifications.

I claim:

1. A method of advertising on a motorsport vehicle adapted to be raced in a race track with at least one other motorsport vehicle, the motorsport vehicle having at least one substantially transparent window, the method of advertising comprising the steps of:

providing a holographic film with a holographic image therein;

adhering the holographic film to the substantially transparent window; and racing the motorsport vehicle on the race track with the other motorsport vehicle to allow viewing of the holographic image by an observer outside the motor sport vehicle;

wherein the holographic film and the holographic image are substantially transparent to an operator of the motorsport vehicle from within the motorsport vehicle so that operation of the motorsport vehicle is not impeded, but the holographic image in the holographic film is visible to the observer outside the motorsport vehicle as the motorsport vehicle is raced in the race track.

2. The method of advertising of claim 1, wherein the substantially transparent window is at least one of a front windshield, a rear windshield, and a side window.

3. The method of advertising of claim 2, wherein the substantially transparent window is a front windshield.

4. The method of advertising of claim 2, wherein the substantially transparent window is made from at least one of glass, plastic, thermoplastic, Plexiglas®, and a polycarbonate.

5. The method of advertising of claim 1, further comprising the steps of applying an adhesive to at least one of the holographic film and the substantially transparent window before adhering the holographic film to the substantially transparent window, the adhesive being substantially transparent when set.

6. The method of advertising of claim 1, wherein the holographic image is at least one of a product name, an organizational name, an organizational logo, a corporate name and a corporate logo.

7. The method of advertising of claim 1, wherein the holographic image is three dimensional.

8. The method of advertising of claim 1, wherein the holographic film includes a plurality of holographic images therein, each of the plurality of holographic images being viewable at different viewing angles.

9. The method of advertising of claim 8, wherein the plurality of holographic images provide a continuous message.

10. The method of advertising of claim 1, further including the step of providing at least one light source on the motorsport vehicle to illuminate the holographic image to enhance visibility of the holographic image in the holographic film.

11. The method of advertising of claim 1, wherein the holographic image is a numeral that advertises the motorsport vehicle operator and identifies the motorsport vehicle thereby distinguishing the motorsport vehicle from the other motorsport vehicle.

12. The method of advertising of claim 1, wherein the holographic image is a sponsor advertisement including at least one of a product name, an organizational name, an organizational logo, a corporate name and a corporate logo.

13. The method of advertising of claim 12, wherein the holographic image is three dimensional.

14. The method of advertising of claim 12, wherein the holographic film includes a plurality of holographic images therein, each of the plurality of holographic images being viewable at different viewing angles.

15. The method of advertising of claim 14, wherein the plurality of holographic images provide a continuous message.

16. The method of advertising of claim 15, wherein the plurality of holographic images are three dimensional.

17. The method of advertising of claim 12, further comprising the steps of illuminating the holographic image by providing at least one light source at a predetermined position to enhance visibility of the holographic image in the holographic film to the observer outside the motorsport vehicle.

18. The method of advertising of claim 17, wherein the at least one light source is a plurality of light sources positioned along the race track to illuminate the holographic image to enhance visibility of the holographic image in the holographic film to a plurality of observers along the race track.

19. The method of advertising of claim 17, wherein the at least one light source is provided on the motorsport vehicle to illuminate the holographic image to enhance visibility of the holographic image in the holographic film.

20. The method of advertising of claim 12, wherein the substantially transparent window is at least one of a front windshield, a rear windshield, and a side window.

21. The method of advertising of claim 20, wherein the substantially transparent window is a front windshield.

22. The method of advertising of claim 20, wherein the substantially transparent window is made from at least one of glass, plastic, thermoplastic, Plexiglas®, and a polycarbonate.

23. The method of advertising of claim 20, further comprising the steps of applying an adhesive to at least one of the holographic film and the substantially transparent window before adhering the holographic film to the substantially transparent window, the adhesive being substantially transparent when set.

* * * * *